United States Patent [19]

Saitoh

[11] Patent Number: 5,220,621
[45] Date of Patent: Jun. 15, 1993

[54] CHARACTER RECOGNITION SYSTEM USING THE GENERALIZED HOUGH TRANSFORMATION AND METHOD

[75] Inventor: Fumihiko Saitoh, Ryuuohchou, Japan

[73] Assignee: International Business Machines Corporation, Armonk, N.Y.

[21] Appl. No.: 738,391

[22] Filed: Jul. 31, 1991

[30] Foreign Application Priority Data

Aug. 1, 1990 [JP] Japan .................. 2-202601

[51] Int. Cl.$^5$ .............................................. G06K 9/62
[52] U.S. Cl. ...................................... 382/22; 382/41
[58] Field of Search .................. 382/22, 41, 54, 1; 364/725

[56] References Cited

U.S. PATENT DOCUMENTS

4,618,989 10/1986 Tsukune et al. ............. 382/22
4,783,828 11/1988 Sadjadi ........................ 382/22

OTHER PUBLICATIONS

Engelbrecht et al., "Polyhedral Object Recognition Using Hough-Space Features," *Pattern Recognition*, vol. 21, No. 2, pp. 155-167, 1988.

Primary Examiner—Leo H. Boudreau
Attorney, Agent, or Firm—Roy R. Schlemmer, Jr.; Louis J. Percello

[57] ABSTRACT

A character recognition system and method using the generalized Hough transform are disclosed. A template table which stores edge point parameters to be used for the generalized Hough transform is compressed so as to include only predetermined parameters, and is then divided into a plurality of template tables which are respectively loaded in the memories of a plurality of subprocessors operating in parallel under the control of a main processor. In performing recognition processing, these subprocessors operate in parallel according to their related partial template tables. Character recognition using the generalized Hough transform provides a high rate of character recognition. Also, parallel processing using the compressed template tables and partial template tables helps shorten table search time and computation time, thereby increasing processing efficiency.

24 Claims, 9 Drawing Sheets

| EDGE POINT NO. | $\theta_i$ | $r_i$ | $\alpha_i$ |
|---|---|---|---|
| 1 | $\theta_1$ | $r_1$ | $\alpha_1$ |
| 2 | $\theta_2$ | $r_2$ | $\alpha_2$ |
| 3 | $\theta_3$ | $r_3$ | $\alpha_3$ |
| ⋮ | ⋮ | ⋮ | ⋮ |
| n | $\theta_n$ | $r_n$ | $\alpha_n$ |

FIG.4

| $\theta_1$ | $r_1$ | $\alpha_1$ |
|---|---|---|
| $\theta_2$ | $r_2$ | $\alpha_2$ |
| ⋮ | ⋮ | ⋮ |
| $\theta_{\frac{m}{n}}$ | $r_{\frac{m}{n}}$ | $\alpha_{\frac{m}{n}}$ |
| $\theta_{\frac{m}{n}+1}$ | $r_{\frac{m}{n}+1}$ | $\alpha_{\frac{m}{n}+1}$ |
| ⋮ | ⋮ | ⋮ |
| $\theta_{\frac{2m}{n}}$ | $r_{\frac{2m}{n}}$ | $\alpha_{\frac{2m}{n}}$ |
| ⋮ | ⋮ | ⋮ |
| $\theta_{\frac{(n-1)m}{n}+1}$ | $r_{\frac{(n-1)m}{n}+1}$ | $\alpha_{\frac{(n-1)m}{n}+1}$ |
| ⋮ | ⋮ | ⋮ |
| $\theta_m$ | $r_m$ | $\alpha_m$ |

FIG. 6

| $\theta_i$ | SUBPROCESSOR NO. |
|---|---|
| $\theta_1$ | 1 |
| $\theta_{\frac{m}{n}+1}$ | 2 |
| $\theta_{\frac{2m}{n}+1}$ | 3 |
| ⋮ | ⋮ |
| $\theta_{\frac{(n-1)m}{n}+1}$ | n |

TEMPLATE REGISTRATION PHASE

RECOGNITION PHASE

CHARACTER RECOGNITION SYSTEM USING THE GENERALIZED HOUGH TRANSFORMATION AND METHOD

BACKGROUND OF THE INVENTION

1. Field of the Invention

The present invention relates to an apparatus and a method for recognizing characters, and more particularly, to an apparatus and a method for recognizing characters by using the generalized Hough transform. This invention is especially favorably applicable to the recognition of identification information marked on semiconductor wafers, electronic circuit modules, and semiconductor or electronic devices such as circuit cards/boards.

2. Prior Art

Semiconductor wafers, electronic circuit modules, and semiconductor or electronic devices such as circuit cards/boards are usually provided with identification information such as product numbers, manufacturing numbers, and lot numbers by marking or printing. Such identification information is read, recognized, and used for various purposes, such as automatic control of manufacturing procedures, sorting of products, and quality control. Industrial character recognition is widely used for the identification not only of semiconductor devices and electronic devices but also of various products.

It is common in conventional industrial character recognition to separate a character to be recognized from an image and then to compare the separated character pattern with standard character patterns of templates. To recognize a wafer identification number of several digits, for example, the conventional character recognition entails separating those digits one by one and then performing pattern matching to each of the digits. In this recognition technique, the character separation phase and the recognition phase are presupposed to be separate processes. In this case, for a higher rate of recognition, it is essential that characters are properly separated and that the separated character patterns retain significant information required for character recognition. In the conventional recognition technique, in cases where adjacent characters contact; in cases where a character or its background involves scratches or noise; or in cases where a character is blurred or indistinct, not only is the pretreatment very troublesome, but also, it is very difficult to attain a higher recognition rate. Particularly where a workpiece, such as a semiconductor wafer, has undergone severe treatment involving etching, the identification information on the surface may suffer damage, or traces of the treatment may remain as noise indistinguishable from the identification information, with the result that inaccurate character recognition occurs. The highest rate of recognition of wafer identification numbers which can be expected from the conventional method of character recognition using pattern matching is no more than 95%.

Another problem attendant on character recognition is that in the conventional recognition technique, providing a separate recognition program from character type to character type is necessary. For example, the size, font, and quality of characters to be used for wafers may be different from those used for circuit modules, in which case it is usual to provide quite different programs. It would be very advantageous if a common recognition program could be applied to different character types with minimum modification.

"Generalizing the Hough Transform to Detect Arbitrary Shapes," by D. H. Ballard, Pattern Recognition, Vol. 13, No. 2 (1981), pp.111-122, describes a generalized Hough transform algorithm capable of extracting graphics of any shape. The Hough transform is a straight line detection algorithm, which was first proposed by P. V. C. Hough (U. S. Pat. No. 3,069,554) and later improved by R. O. Duda and P. E. Hart (R. O. Duda and P. E. Hart, "Use of the Hough Transform to Detect Lines and Curves in Pictures," Communications of the ACM, Vol. 15, No. 1, pp.11-15, 1972). The generalized Hough transform is an algorithm that develops the straight line detection Hough transform for the sake of detecting graphics of arbitrary shapes. In Ballard's paper, however, how to apply the generalized Hough transform to character recognition and how to perform efficient character recognition by use of the generalized Hough transform are not disclosed. Because the Hough transform entails a large amount of computations in transforming image information into a Hough space, that is, a parameter space, some device for heightening processing efficiency must be invented to utilize the generalized Hough transform in character recognition.

SUMMARY OF THE INVENTION

A main object of this invention is to provide a character recognition apparatus and method capable of attaining high rates of character recognition.

Another object of this invention is to provide an efficient character recognition system and method using the generalized Hough transform.

The objects of the present invention are accomplished in general by recognizing characters through use of the generalized Hough transform. In a template registration phase, a template table is generated for each of basic character patterns to be used for character recognition, and is stored in a memory. Each of template table stores parameters to be used for the generalized Hough transform, more particularly, parameters representing a gradient direction at each of edge points of an image of a corresponding character pattern and a straight line connecting each of the edge points and a predetermined reference point.

In a recognition phase, edge points of an image of a particular object including a character to be recognized is detected. Based upon data specifying a template table and the detected edge points, the parameters to be used for the generalized Hough transform of the detected edge points are accessed from the specified template. The generalized Hough transform is performed based upon the accessed parameters and the coordinates of the detected edge points. Each time the generalized Hough transform is performed, a cumulative value for the coordinates generated by the transform is recorded. The cumulative values for the generated coordinates are compared with a predetermined threshold value for the specified template table. If there is a cumulative value exceeding the threshold value, it means that a character corresponding to the specified template table exists at the location in the image of the object which is represented by the coordinates for the cumulative value.

The template tables can be compressed so as to include only data concerning edge points on curved edge portions of the basic character patterns. Such compression helps reduce the amount of data in the template tables and lessens the computational workload required for the generalized Hough transform with little influence on recognition rate.

Also, each template table can be divided into a plurality of partial template tables, which are stored separately in corresponding memories of a plurality of processors operating in parallel. This helps shorten the table search and computation time and thus heightens recognition processing efficiency.

BRIEF DESCRIPTION OF THE DRAWINGS

FIG. 4 shows a template table.

FIG. 6 shows division of a template table.

DESCRIPTION OF THE PREFERRED EMBODIMENT

Figure 1:
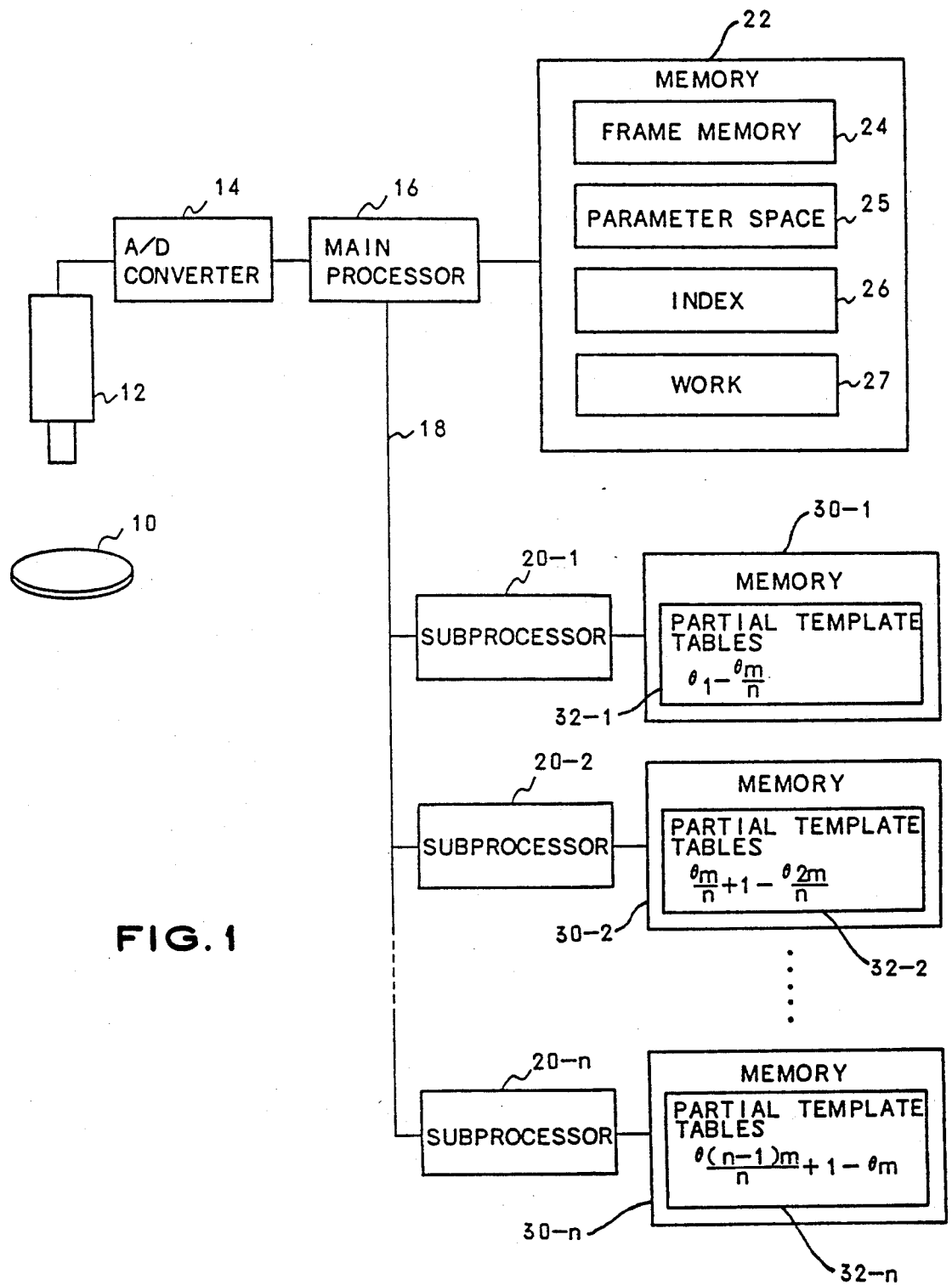
FIG. 1 shows a schematic block diagram illustrating the entire arrangement of the invention.

FIG. 1 is a block diagram showing an arrangement of the present invention. An object for character recognition 10 is, for example, a wafer with an identification number. The identification number of the wafer 10 is picked up by a camera 12, such as a CCD camera, and the image is quantized by an A/D converter 14. The image is quantized, for example, at 8 bits per pixel, that is, at 256 levels. The digitized image data is stored in a frame memory area 24 of a memory 22 by a main processor 16. The memory 22 also includes a parameter space memory area 25, a template table index memory area 26, and a work memory area 27 to be used temporarily for other purposes.

The main processor 16 is connected through a bus 18 to subprocessors 20-1 to 20-$n$ operating in parallel under the control of the main processor 16. The subprocessors are connected respectively to memories 30-1, 30-2, to 30-$n$. The memories 30-1, 30-2, 30-$n$ store partial template tables 32-1, 32-2, to 32-$n$ that constitute parts of template tables for basic character patterns to be used for character recognition, for example, alphanumerics. If a template table for one character is divided into n parts, it is necessary to provide n subprocessors 20 and n memories 30-1 to 30-$n$ in which to separately store n partial template tables. There-fore, each memory is provided with as many partial template tables as there are basic character patterns. The subprocessors 20 are used for pattern matching in the recognition phase.

The following explains character recognition processing using the generalized Hough transform. Character recognition processing involves a phase of generating and registering a template for each of the basic character patterns, and a phase of recognizing characters according to the registered templates.

Figure 8:
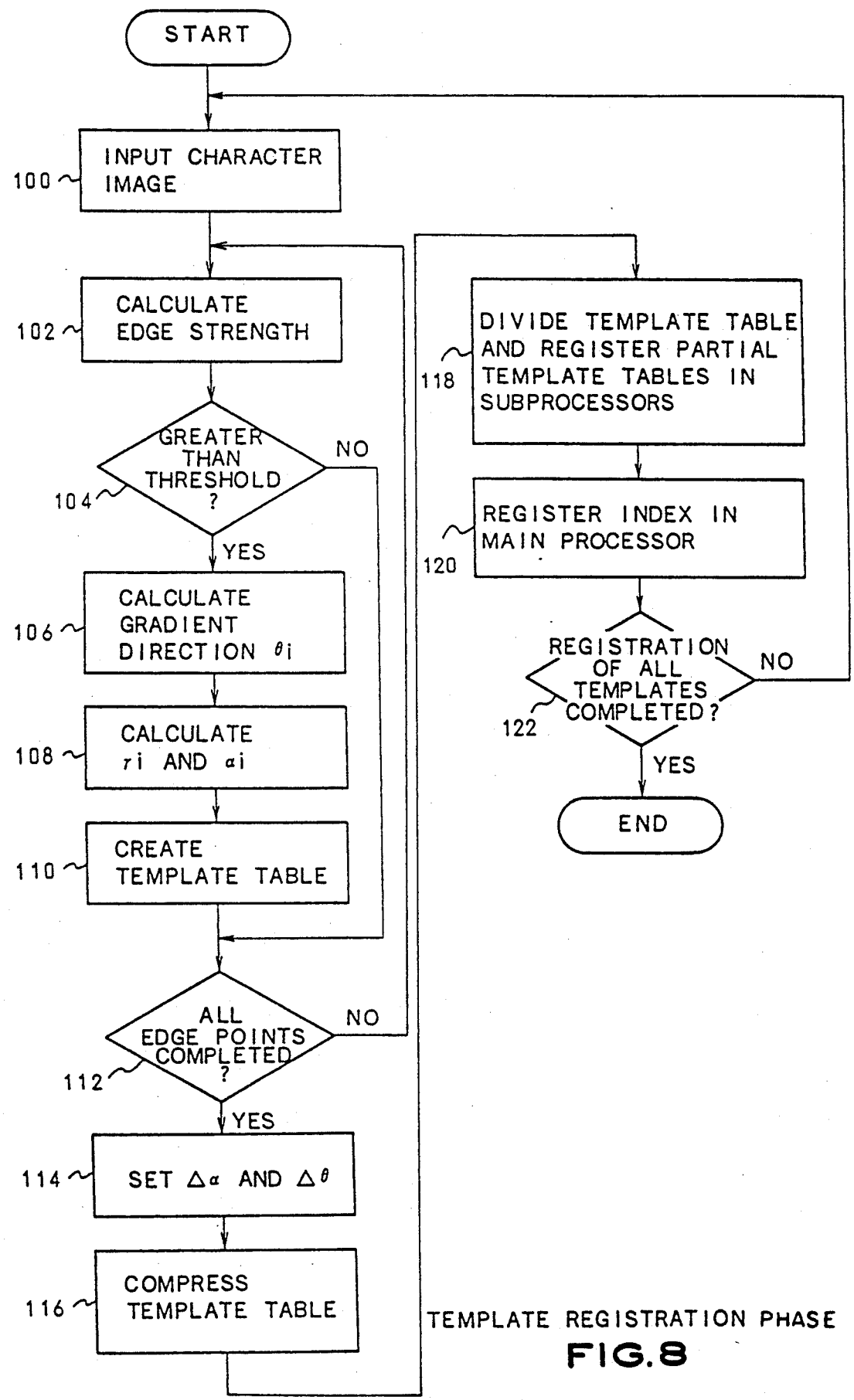
FIG. 8 shows a flowchart of the template registration phase.

Template registration phase:

The steps shown in FIG. 8 are performed in the template registration phase. At step 100 basic character patterns are picked up by a camera 12. If the object of character recognition is a semiconductor wafer, characters of standard quality marked on a sample semiconductor wafer may be used as the basic character patterns. Of course, it is possible that the basic character patterns are printed on a recording medium such as paper, and picked up by the camera 12. Each image is digitized at 8 bits per pixel by the A/D converter 14 and stored in the frame memory area 24 of the memory 22.

The main processor 16 then determines edge points of the image stored in the frame memory area 24 and edge point parameters to be used for the generalized Hough transform. The edge points can be detected by any conventional method. For example, they can be found by performing first differential for each pixel by use of the Prewit operators shown in FIG. 2 while scanning the image in the frame memory area 24. Edge intensity is calculated as the sum of the absolute value of an X-direction differential value and the absolute value of a Y-direction differential value (step 102). When the sum exceeds a predetermined threshold value, the pixel at the moment is determined as an edge point (step 104).

Figures 2, 3:
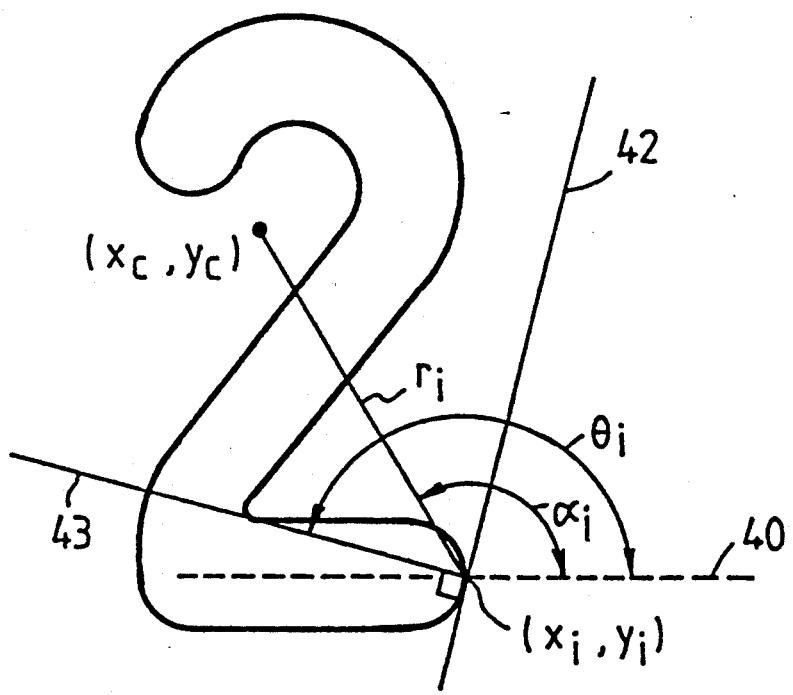
FIG. 2 shows Prewit differential operators.
FIG. 3 shows edge point parameters used in the generalized Hough transform.

FIG. 3 shows edge point parameters $\theta i$, $ri$, and $\alpha i$ used for the generalized Hough transform. In FIG. 3, the point $(xi, yi)$ is an edge point determined as above; the point $(xc, yc)$ is a reference point selected at will; the broken line 40 is a horizontal line which serves as a reference line; the line 42 is a tangent at the edge point $(xi, yi)$; the line 43 is a normal at the edge point $(xi, yi)$; the line $ri$ is a line connecting the reference point $(xc, yc)$ and the edge point $(xi, yi)$; $\alpha i$ is the direction angle of the line $ri$ to the horizontal line 40; the gradient direction $\theta i$ is an angle representing the tangent 42. Although the gradient direction $\theta i$ in FIG. 3 is expressed as angle of the horizontal line 40 to the normal 43, $\theta i' = -(\theta i - 90°) = $ (angle of tangent 42 to horizontal line 40) may be used instead. $ri$ and $\alpha i$ represent the vector connecting the reference point $(xc, yc)$ and the edge point $(xi, yi)$.

The main processor 16 sets a reference point $(xc, yc)$ for the character being processed and computes $\theta i$, $ri$, and $\alpha i$ for each detected edge point. The gradient direction $\theta i$ at each edge point is determined by $$\tan^{-1} \frac{(Y\text{-direction differential value})}{X\text{-direction differential value}}$$

(step 106). $ri$ and $\alpha i$ are determined based upon the reference point $(xc, yc)$ to the edge point $(xi, yi)$ (step 108). Although these parameters may be computed after all edge points are determined, it is more efficient to determine the parameters each time one edge point is determined.

Figure 5A:
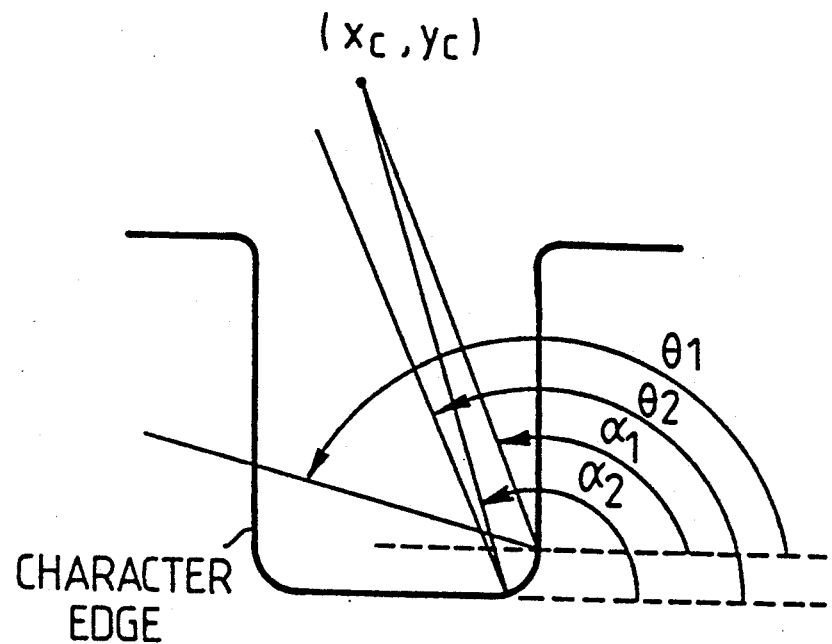
FIGS. 5A, 5B and 5C show compression of a template table.

The main processor 16 stores parameters $\theta i$, $ri$, and $\alpha i$ for each edge point in a template table, as shown in FIG. 4 (step 110), where $\theta i$ serves as a key and $ri$ and $\alpha i$ are data. The table corresponds to the R table of the generalized Hough transform. With the generalized Hough transform, $\theta i$ is quantized and one or more edge point vectors $(ri, \alpha i)$ are stored in the R table for each of the quantization steps. In the present invention, in contrast, $\theta i$ is not quantized, but the parameters for each edge point are stored in a template table. The template table is then stored in the work area 27. When the parameters have been extracted for each of the edge points (step 112), step 114 begins.

Where the character image includes a number of edge points, the template table becomes very large resulting in increased recognition processing time. Thus, this invention compresses the template table so as to include only a minimum amount of data required for character recognition. Because character patterns in general are considered to contain more features in their curved portions than in their linear portions, this invention excludes edge data for linear portions from each template table. On horizontal and vertical edge portions, many edge points may occur with very close $\theta i$ values. In contrast, on curved edge portions, such as corners or curved portions of the character image, the rate of the change in $\theta$ to the change in $\alpha$ is relatively large, as in FIG. 5A. That is, the angular difference between $\alpha 1$ and $\alpha 2$ for two edge points is relatively small, whereas the angular difference between $\theta 1$ and $\theta 2$ is relatively large. In this invention, the template tables are compressed by taking advantage of the property mentioned above. The edge points on a template table are sequentially scanned to extract from the template table edge points with $\alpha$ values falling within the range $\alpha i \pm \delta \alpha$ and $\theta$ values falling outside the range $\theta i \pm \delta \theta$ with respect to a certain edge point with $\alpha i$ and $\theta i$. The extracted edge points are erased from the template table. Another edge point is again selected from the remaining edge points on the template table. Edge points meeting the above mentioned condition are extracted and erased from the template table. This step is repeated with respect to the remaining edge points in the template table.

Figure 5B:
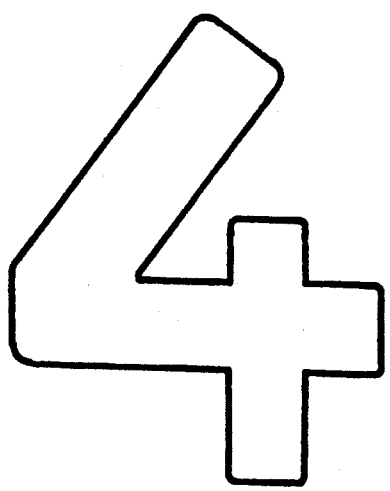
Figure 5C:
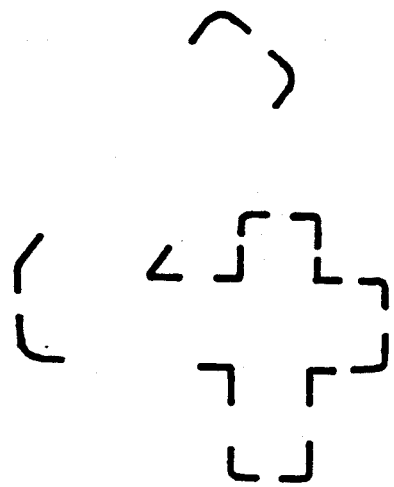

If each digit of the wafer identification number is represented by 48×32 pixels, and the average number of edge points per digit is on the order of 200 to 250, it is possible to compress the template table by a factor of ½ to ⅓ at an angle $\delta \alpha$ of 2° and an angle $\delta \theta$ of 3°. The compression rate can be heightened further by making $\delta \alpha$ still smaller and $\delta \theta$ still larger at the sacrifice of recognition accuracy. As a compromise, it is preferable to set $\delta \alpha$ at an angle between 0.5° and 5° and $\delta \theta$ at an angle between 20° and 60°. FIG. 5B shows an original character and FIG. 5C shows character portions extracted by the compression processing. Because the linear portions may involve some unevenness, some edge points of the linear portions may be extracted.

Therefore, in the template registration phase, a $\delta \alpha$ value and a $\delta \theta$ value are set (step 114 in FIG. 8). The template table is scanned, and compressed by extracting only the edge points meeting the predetermined condition (step 116). The entries for the extracted edge points are rearranged in ascending order of $\theta i$ to generate a compressed template table. The compressed table is stored in the work area 27.

Then, the program proceeds to step 118 where the compressed template table is divided into n partial template tables. The partial template tables are stored in the memories 30-1 to 30-n through the subprocessors 20-1 to 20-n. FIG. 6 shows the compressed template table divided into n.

Figures 7, 11:
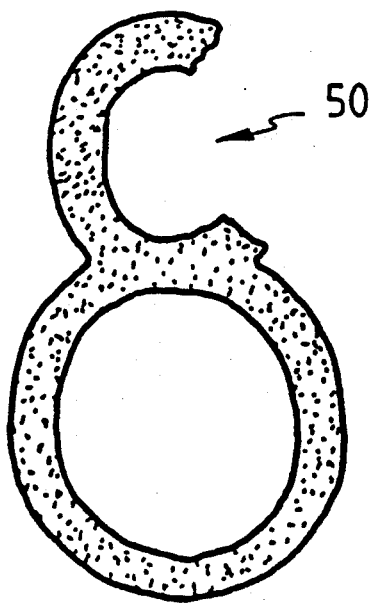
FIG. 7 shows an index table.
FIG. 11 shows the numeral '8' with a nick.

The first $\theta i$ value in each partial template table and the address of the associated subprocessor are stored in the index area 26 (step 120). FIG. 7 shows an index table.

The registration of a template for one character is thus completed. The template registration process is continuously performed on each character and is completed when all characters are processed (step 122). When the template registration phase is completed, each of the memories 30-1 to 30-n has partial template tables for all the characters. Because the distribution of edge point parameters significantly differs from character to character, an index table is provided for each template table and is stored in the index area 26.

Recognition phase

Figure 9:
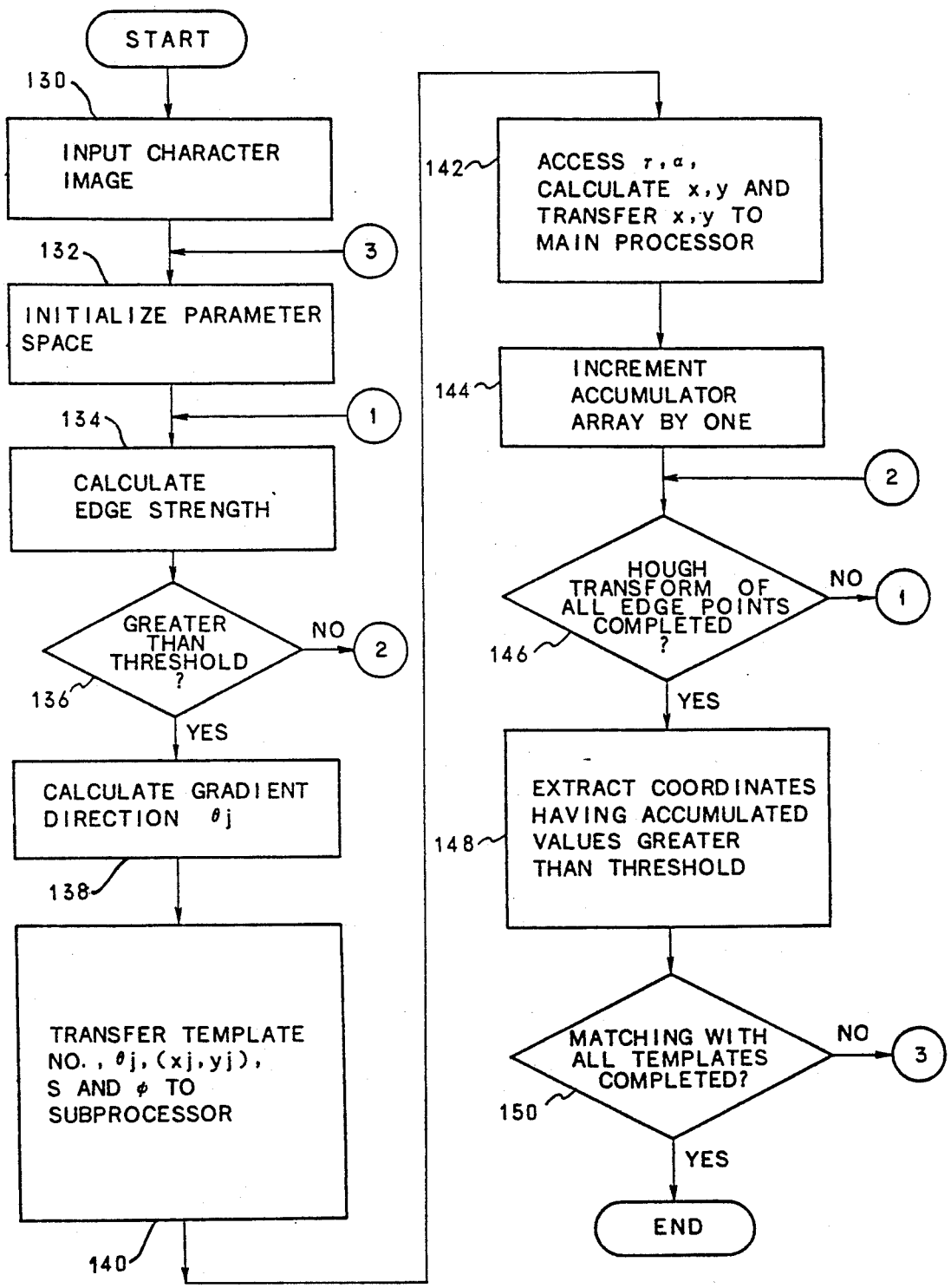
FIG. 9 is a flowchart of the recognition phase.

In the recognition phase, the steps shown in FIG. 9 are performed to recognize the identification number of a wafer. The wafer area containing the identification number is captured by the camera 12 at step 130, quantized at 8 bits/pixel by the A/D converter 14, and stored in the frame memory area 24 by the main processor 16.

The main processor then initializes the parameter space area 25 to all zeros (step 132).

The main processor 16 scans in sequence the image in the frame memory area 24; computes the edge intensity of the image (step 134) as described before; determines as an edge point a point where the edge intensity exceeds a predetermined threshold value (step 136); and determines a gradient direction $\theta j$ at the edge point (step 138).

If the wafer identification number consists of eight digits, it should be noted that in this invention each digit is not separated, but the whole of an image including the eight digits is treated as a single image for edge detection.

The main processor 16 makes reference to an index table corresponding to the template character to be matched, determines which subprocessor contains the partial template table for the calculated $\theta j$ value, and sends the following data to the subprocessor having the applicable partial template table (step 140):

(1) a template table number corresponding to the template character to be matched at the moment;
(2) the coordinates (xj, yj) of the detected edge point;
(3) a gradient direction $\theta j$ at the edge point (xj, yj);
(4) a scale factor S; and
(5) a rotational angle $\phi$.

Each subprocessor has a partial template table for each template character. The recognition process is carried out by matching the detected image with each template character sequentially. Therefore, when the image is to be matched with the numeral '1', a number is supplied to specify a template table corresponding to the numeral '1'.

The scale factor S indicates a relation between the size of a character image stored in the frame memory 24 in the template registration phase and the size of a character image stored in the frame memory 24 in the recognition phase. If two such character images always agree in size with each other, it is needless to use any such scale factor (S). However, cases may often arise where the two character images disagree in size with each other for some reasons such as a variation in the magnification of the camera 12. Therefore, the main processor 16 provides the subprocessor with a plurality of scale factor (S) values required to compensate for possible size variations, e.g., three S values of 0.95, 1.0, and 1.05. Even if the actual scale factor falls between these values, it will have no substantial influence on recognition rate.

Cases may also arise where a detected character image rotates because of wafer or camera displacement. The main processor 16 provides the subprocessor with a plurality of rotational angles $\phi$ required to compensate for possible variations in rotational position, e.g., nine $\phi$ values of $-4°$, $-3°$, $-2°$, $-1°$, 0°, 1°, 2°, 3°, and 4°. Needless to say, the parameter $\phi$ need not be used if the rotational angle is always 0°.

The selected subprocessor locates a $\theta i$ value close to the $\theta j$ value in the partial template table corresponding to the specified character, and accesses the corresponding ri and αi. The subprocessor computes the following equations using these values (step 142) and performs the generalized Hough transform on the detected edge point (xj, yj):

$$x = xj + ri\, S \cos(\alpha i + \phi) \quad (1)$$

$$y = yj + ri\, S \cos(\alpha i + \phi) \quad (2)$$

The partial template table may not necessarily contain a θi which coincides with the θj value. Thus, if it is programmed to select only θi equal to θj, accuracy will be lowered although the amount of calculations may be reduced. For this reason, it is preferable to set an approximation range according to a trade-off between the two. In this example, the approximation range (θj±2°) was selected.

The subprocessor returns a result (x, y) to the main processor 16. In this example, $3 \times 9 = 27$ sets of (S, φ) are used. Accordingly, where one θi which is equal or approximate to θj is found, the subprocessor returns 27 sets of coordinates (x, y) to the main processor 16. Similarly, where two θi values are found, the subprocessor returns 54 sets of coordinates (x, y) to the main processor. The coordinates (x, y) are the coordinates of a candidate for reference point for the edge point (xj, yj), represented by the coordinate system for the image in the frame memory 24.

The main processor 16 increments by one the value of a coordinate element (x, y, S, φ) in a four-dimensional parameter space represented by the four parameters x, y, S, and φ (step 144). The parameter space memory area 25 has an accumulator array having registers at locations corresponding to the coordinate elements (x, y, S, φ). The main processor increments a corresponding register by one in response to the transformed coordinates returned from the subprocessor, and records a cumulative value for the parameter space coordinates.

At step 146, a check is made as to whether or not the generalized Hough transform of all the edge points is completed. If no, steps 134 to 144 are repeated for each edge point.

When the Hough transform of all the edge points is completed, the cumulative values in the accumulator array are compared with a threshold value preset for the current template character, and coordinates having a cumulative value exceeding the threshold value are extracted (step 148).

If there is no cumulative value exceeding the threshold value, it means that the template character being matched is not included in the wafer identification number.

If one cumulative value for certain four-dimensional coordinates (x, y, S, φ) exceeds the threshold value, this provides the following information:
(1) There will exist one character in the wafer identification number, which corresponds to the template character now being matched.
(2) The character will have its reference point at a location indicated by the coordinates (x, y) in the coordinate system of the frame memory 24.
(3) The character will exist in the frame memory 24 with a scale factor S and a rotational angle φ.

If the reference point is set within the character area, more preferably near the center of the character area, in the template registration phase, the location of the corresponding character in the image can be indicated directly by the coordinates (x, y), and accordingly, both the character included in the image and its location can be detected.

If the cumulative values of two elements for four-dimensional coordinates (x1, y1, S1, φ1) and coordinates (x2, y2, S2, φ2) exceed the threshold value, it means that the wafer identification number includes two same characters; one having its reference point at an image location indicated by the coordinates (x1, y1), with a scale factor of $S_1$ and a rotational angle of $\phi_1$; the other having its reference point at an image location indicated by the coordinates (x2, y2), with a scale factor of $S_2$ and a rotational angle of $\phi_2$.

Optimum threshold values to be used for detecting cumulative values may differ from template character to template character. Accordingly, an optimum threshold value is established in advance for each template character, and in the recognition phase a threshold value is used corresponding to the template character being matched at the moment.

At step 150, a check is made to ascertain if matching with all the template characters is completed. If no, the process returns to step 132, and the accumulator array (parameter space) is reinitialized. A next template character is then specified by template number. At steps 134 to 148, all the edge points are matched with the next template character to detect cumulative values exceeding a threshold value for the template character.

A similar process is repeated until all the template characters have been matched. When the matching with all the template characters is completed, the program can know the characters included in the wafer identification number and their locations and accordingly is able to recognize the wafer identification number.

In recognition processing using the generalized Hough transform, the greater part of the overall processing time is consumed in template table searching and coordinate computation. In contrast, the processing time for the steps 134 to 138 performed by the main processor 16 and the time for data transfer from the main processor 16 to a subprocessor 20 take only a small art. Accordingly, the time-consuming processes can be shared by the subprocessors operating in parallel, resulting in a considerable reduction in processing time Moreover, table search time is shortened considerably by the template table division.

Figure 10:
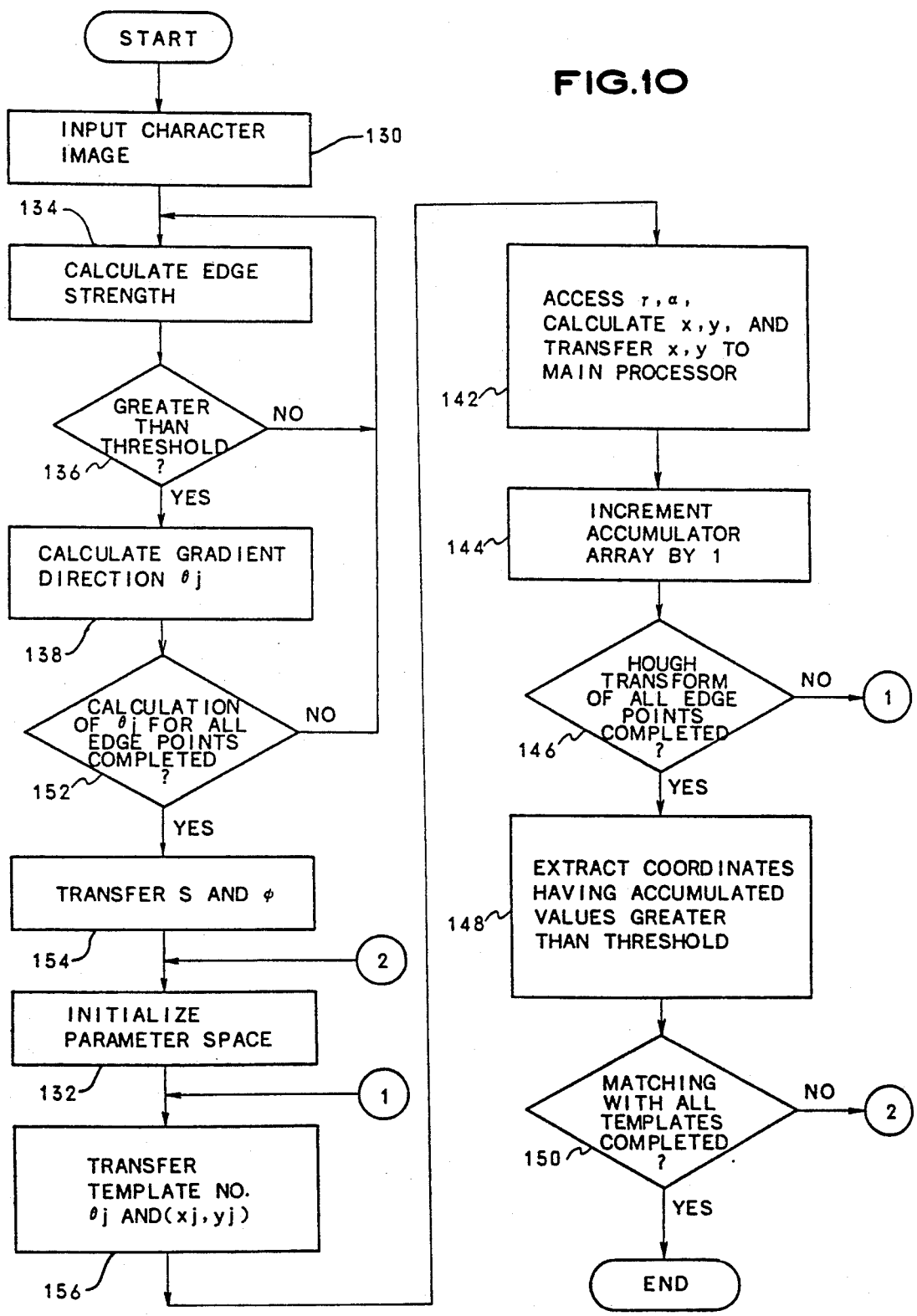
FIG. 10 shows a flowchart of a modified recognition phase.

Although in FIG. 9 the edge intensity and gradient direction θj are computed repeatedly for each template character, they may be computed at a time as shown in FIG. 10. The respective steps in FIG. 10 are designated by the same reference numbers as the corresponding steps in FIG. 9. Referring now to FIG. 10, after the completion of computation of θj for all edge points is detected at step 152, a scale factor (S) and a rotational angle (φ) are transferred to each subprocessor at step 154. Then, the parameter space is initialized at step 132. A template number, a gradient direction θj and coordinates (xj, yj) are then transferred to a particular subprocessor at step 156. According to FIG. 10, it is sufficient to compute the edge intensity and gradient direction θj only once, and it is sufficient to transfer a scale factor S and a rotational angle φ only once, but the program tends to become somewhat complicated.

In FIGS. 9 and 10, both gradient direction θj and edge point coordinates (xj, yj) are sent to a subprocessor concurrently and then the related r and α are read at step 142. However, it may be possible to send first only a gradient direction θj to make a table search and then to send coordinates (xj, yj) [(xj, Yj), S and φ in FIG. 9]. Moreover, although in FIGS. 9 and 10 template table numbers are sent to a selected subprocessor, it may be possible to program in such a manner that the template table numbers be sent in a batch to all the subprocessors at a suitable time.

As long as the character quality of the object to be recognized is normal, if the detecting threshold value is suitably selected, the problem of malrecognition would seldom arise. Yet, if, as in FIG. 11, the number '8' has a nick 50 due to damage, a case may arise such that it is detected in both of the template characters '6' and '8'. In such a case where two or more characters are detected at the same coordinates, it can be so designed that a character with a higher cumulative value is selected.

The advantages of this invention are as follows:

(1) This invention enables the attainment of a very high rate of character recognition. With an 8-digit numeral wafer identification number, a recognition rate of at least 99.5% could be attained.

(2) Irrespective of where the characters to be recognized occur in the image, or even if they are not in alignment, they can be recognized without the need to separate the characters one by one and without troublesome preprocessing.

(3) Even where the characters are rotated or different in size from one another, accurate recognition is possible.

(4) Inasmuch as characters are recognized based upon information about the edges of character patterns, the character recognition is hardly affected by noise. Even where a character involves a partial deformation or a blurred part, or when characters contact or overlap each other, character recognition is hardly affected. Where characters contact or overlap each other, edge information for such contacts or overlapped portions will be lost. Nevertheless, so long as the remaining edge information is still retained, in most cases no serious effect is produced on character recognition, except that the cumulative values in the accumulator array lower slightly.

(5) Characters of various fonts could be recognized by use of a common recognition program, if the related templates are just registered in advance.

(6) Although the generalized Hough transform entails enormous amount of computation, a practically acceptable processing speed can be attained by the compression of template tables and parallel processing using partial template tables and multiprocessors. Still more favorable effects will be expected if this invention is combined with another speedy method of character recognition such that this invention is applied to recognize only those objects which the high-speed method of character recognition has failed to recognize.

It will, of course, be apparent that many changes in the form and details of the disclosed embodiment may be made by those skilled in the art without departing from the spirit and scope of the present invention as set forth in the appended claims.

I claim:

1. A character recognition system comprising:
   means for storing a template table for each of a plurality of basic character patterns, which includes parameters extracted at edge points of an image of the basic character pattern used for the generalized Hough transform;
   means for detecting an image of an object including a character to be recognized;
   means for detecting edge points of the image of said object;
   means for accessing, based upon data specifying a selected template table and said detected edge points, parameters from said selected template table, which are used for the generalized Hough transform of said detected edge points;
   means for performing the generalized Hough transform based upon said accessed parameters and coordinates of said detected edge points;
   means for recording cumulative values for the coordinates generated by said transform; and
   means for judging from said recorded cumulative values whether or not the image of said object includes the character corresponding to said selected template table.

2. A character recognition system according to claim 1, wherein said parameters stored in each said template table define a gradient direction at each of the edge points of the image of the corresponding basic character pattern and a straight line connecting each of the edge points and a predetermined reference point and wherein said edge point detecting means includes means for detecting the coordinates of, and a gradient direction at, each of the edge points of the image of said object, and said accessing means includes means for accessing from said selected template table said straight line defining parameters for the edge points having gradient directions approximately equal to the gradient directions detected at the edge points of the image of said object.

3. A character recognition system according to claim 1, including means for compressing each said template table so as to include only the parameters for the edge points of curved edge portions of the image of the corresponding basic character pattern.

4. A character recognition system according to claim 1, wherein each said template table is divided into a plurality of partial template tables; said storing means consisting of a plurality of memory units allocated to store said partial template tables individually; said accessing means and said performing means being provided for each of said memory units; a plurality of said accessing means and said performing means being operated in parallel.

5. A character recognition system according to claim 1, wherein said judging means includes means for comparing said stored cumulative values with a predetermined threshold value associated with said selected template table.

6. A character recognition system comprising:
   means for generating a template table which includes parameters extracted at edge points of an image of a basic character pattern for character recognition used for the generalized Hough transform;
   means for compressing said template table so as to include only said parameters for the edge points of curved edge portions of said image;
   means for storing said compressed template table;
   means for detecting an image of an object including a character to be recognized;
   means for detecting edge points of the image of the object;
   means for accessing, based upon said detected edge points, parameters to be used for the generalized Hough transform of said detected edge points from said compressed template table stored in said storing means;

means for performing the generalized Hough transform based upon said accessed parameters and the coordinates of said detected edge points;

means for recording cumulative values for the coordinates generated by said transform; and means for judging from said recorded cumulative values whether or not the image of said object includes the character corresponding to said template table.

7. A character recognition system according to claim 6, wherein the parameters stored in said template table define a gradient direction at each of the edge points of the image of the basic character pattern and a straight line connecting each of the edge points and a predetermined reference point and wherein said edge point detecting means includes means for detecting the coordinates of, and a gradient direction at, each of the edge points of the image of said object; said accessing means including means for accessing from said template &able said straight line defining parameters for the edge points having gradient directions approximately equal to the gradient directions detected at the edge points of the image of said object.

8. A character recognition system comprising:

means for detecting an image of an object including a character to be recognized, a main processor means having memory means and being connected to said detecting means, and a plurality of subprocessor means connected to said main processor means through a common bus and each having memory means, said memory means in each said subprocessor means storing partial template tables each of which is a different part of an overall template table, each of said partial template tables containing a gradient direction at each of a plurality of edge points of an image of a different one of basic character patterns to be used for character recognition and a straight line connecting each of the edge points and a predetermined reference point;

said main processor means including means for detecting the coordinates of, and a gradient direction at, each of edge points of the image of said object;

said main processor means including means for supplying a template table number and the coordinates and gradient direction for each of the detected edge points to a selected subprocessor means having stored therein a partial template table including the detected gradient direction;

said selected subprocessor means each including means for accessing the parameters for an edge point having a gradient direction approximately equal to said detected gradient direction;

said selected subprocessor means performing the generalized Hough transform based upon said accessed parameters and the coordinates of said detected edge point, and then transferring the resultant coordinates generated by the transform to said main processor means;

said main processor means recording cumulative values for the coordinates transferred from said subprocessor means, and determining from said stored cumulative values whether said image of said object includes the character corresponding to said selected template table.

9. A character recognition system according to claim 8, wherein said memory means of said main processor means includes means for storing an index table for each of said template tables which indicates the correspondence between said partial template tables and said subprocessor means.

10. A method for character recognition comprising the steps of:

storing in a memory a template table for each of a plurality of basic character patterns, which includes parameters extracted at edge points of an image of the basic character pattern used for the generalized Hough transform;

detecting edge points of an image of an object including a character to be recognized;

accessing, based upon data specifying a selected template table and said detected edge points, parameters from said selected template table, which parameters are used for the generalized Hough transform of said detected edge points;

performing the generalized Hough transform based upon said accessed parameters and the coordinates of said detected edge points;

recording cumulative values for the coordinates generated by said transform; and judging from said recorded cumulative values whether or not the image of said object includes the character corresponding to said selected template table.

11. A method for character recognition according to claim 10, wherein each of said parameters stored in each said template table defines a gradient direction at each of the edge points of the image of the corresponding basic character pattern and a straight line connecting each of the edge points and a predetermined reference point and wherein said edge point detecting step includes detecting the coordinates of, and a gradient direction at, each of the edge points; and said parameter accessing step includes accessing from said selected template table said straight line defining parameters for the edge points having gradient directions approximately equal to said detected gradient directions.

12. A method for character recognition according to claim 10, wherein said judging step includes comparing said recorded cumulative values with a predetermined threshold value for said selected template table.

13. A method for character recognition according to claim 10, including compressing each said template table so as to include only said parameters for the edge points of curved edge portions of the image of the corresponding basic character pattern.

14. A method for character recognition according to claim 10, including dividing each said template table into a plurality of partial template tables, which are respectively stored in memories of a plurality of subprocessors capable of operating in parallel under the control of a main processor.

15. A method for character recognition comprising the steps of:

generating a template table which includes parameters extracted at edge points of an image of a basic character pattern for character recognition used for the generalized Hough transform;

compressing said template table so as to include only said parameters for the edge points of curved edge portions of said image;

detecting each of a plurality of edge points of an image of an object including a character to be recognized;

accessing parameters to be used for the generalized Hough transform of said detected edge points from said compressed template table;

performing the generalized Hough transform based upon said accessed parameters and the coordinates of said detected edge points; p1 recording cumulative values for the coordinates generated by said transform; and judging from said recorded cumulative values whether or not the image of said object includes the character corresponding to said template table.

16. A method for character recognition according to claim 15, wherein said parameters stored in said template table define a gradient direction at each of the edge points of the image of said basic character pattern and a straight line connecting each of the edge points and a predetermined reference point and, wherein said edge point detecting step includes detecting the coordinates of, and a gradient direction at, each of the edge points, and said parameter accessing step includes accessing from said template table said straight line defining parameters for the edge points having gradient directions approximately equal to the detected gradient directions.

17. A method for character recognition comprising the steps of:

generating a template table which includes parameters used for the Hough transform and extracted at edge points of a basic character pattern for character recognition;

dividing said template table into a plurality of partial template tables;

storing said partial template tables respectively in memories of a plurality of subprocessors capable of operating in parallel under the control of a main processor;

detecting, by said main processor, edge points of an image of an object including a character to be recognized said main processor having an index table indicating the correspondence between said partial template tables and said subprocessors;

operating said subprocessors in parallel so as to access from said partial template tables said parameters to be used for the generalized Hough transform of the detected edge points;

performing the generalized Hough transform by said subprocessors based upon said accessed parameters and the coordinates of said detected edge points;

transferring the coordinates generated by said transform from said subprocessors to said main processor;

recording cumulative values for said transferred coordinates by said main processor; and judging from said recorded cumulative values whether or not the image of said object includes the character corresponding to said template table.

18. A method for character recognition according to claim 17, including compressing said generated template table so as to include only the parameters for the edge points of curved edge portions of the image of said basic character pattern.

19. A method for character recognition comprising the steps of:

generating a template table for each of a plurality of basic character patterns, which includes parameters representing a gradient direction at each of a plurality of edge points of an image of the character pattern and a straight line connecting each of the edge points and a predetermined reference point;

dividing said template tables into a plurality of partial template tables;

storing said partial template tables respectively in a plurality of subprocessors connected in parallel to one main processor;

detecting by said main processor the coordinates of, and a gradient direction at, each of the plurality of edge points of an image of an object including a character to be recognized;

supplying a template table number and each of said detected gradient directions from said main processor to a selected subprocessor having a partial template table including the detected gradient direction;

accessing by said selected subprocessor the parameters for an edge point having a gradient direction approximately equal to said detected gradient direction from said partial template table of the template table specified by said template table number;

performing the generalized Hough transform by said selected subprocessor based upon said accessed parameters and the coordinates of said detected edge point;

transferring the coordinates determined by said transform from said selected subprocessor to said main processor;

recording by said main processor cumulative values for said coordinates transferred from said subprocessor;

comparing said cumulative values with a predetermined threshold value for said specified template table; and judging from the result of said comparison, whether or not the image of said object includes the character corresponding to said specified template table.

20. A method for character recognition according to claim 19, wherein said parameters represent the length of a straight line connecting each of the edge points and a predetermined reference point and an angle formed by each of said straight lines with a predetermined reference line.

21. A method for character recognition according to claim 19, wherein the entries of said template table are arranged in ascending order of said gradient directions before said dividing step.

22. A method for character recognition according to claim 21, wherein said main processor has an index table for each of said template tables, which indicates the correspondence between said partial template tables and said subprocessors for each of said template tables.

23. A method for character recognition according to claim 19, including said selected subprocessor accessing the parameters for an edge point having a gradient direction falling within a predetermined range of approximation to said detected gradient direction.

24. A method for character recognition according to claim 19, including compressing each said template table before said dividing step so as to include only said parameters for the edge points for curved edge portions of the image of said basic character pattern.

* * * * *